US010906698B2

(12) United States Patent
McCrossin

(10) Patent No.: US 10,906,698 B2
(45) Date of Patent: Feb. 2, 2021

(54) CONTAINER FOOTING SYSTEM AND METHOD OF USE

(71) Applicant: Peter McCrossin, Alexandria, VA (US)

(72) Inventor: Peter McCrossin, Alexandria, VA (US)

( * ) Notice: Subject to any disclaimer, the term of this patent is extended or adjusted under 35 U.S.C. 154(b) by 0 days.

(21) Appl. No.: 16/287,872

(22) Filed: Feb. 27, 2019

(65) Prior Publication Data

US 2019/0263565 A1    Aug. 29, 2019

Related U.S. Application Data

(63) Continuation of application No. 62/635,763, filed on Feb. 27, 2018.

(51) Int. Cl.
*B65D 90/12* (2006.01)
*B65D 25/24* (2006.01)
*B65F 1/14* (2006.01)
*B65F 1/02* (2006.01)

(52) U.S. Cl.
CPC ............... *B65D 25/24* (2013.01); *B65F 1/02* (2013.01); *B65F 1/14* (2013.01)

(58) Field of Classification Search
CPC ... B65D 25/24; B65F 1/02; B65F 1/14; B65F 1/141
USPC ....... 220/629, 908, 630, 729, 17.1; 248/439, 248/158, 188, 188.2
See application file for complete search history.

(56) References Cited

U.S. PATENT DOCUMENTS

| 733,984 | A | * | 7/1903 | Thompson | ............... | B44D 3/14 |
| | | | | | | 248/148 |
| 2,804,989 | A | * | 9/1957 | Mango | ................... | B65D 25/24 |
| | | | | | | 220/629 |
| 7,628,289 | B1 | * | 12/2009 | Boyd | ...................... | B65F 1/141 |
| | | | | | | 220/630 |
| 2003/0076017 | A1 | * | 4/2003 | Helot | ...................... | G06F 1/181 |
| | | | | | | 312/223.2 |
| 2005/0230400 | A1 | * | 10/2005 | Robinson | ................ | B65F 1/068 |
| | | | | | | 220/629 |

* cited by examiner

*Primary Examiner* — Fenn C Mathew
*Assistant Examiner* — Elizabeth J Volz

(57) ABSTRACT

A container system includes a container having a body with a lower surface a first opening extending from the lower surface; a first footing having a contouring of the opening and the first footing is pivotally attached to the container.

1 Claim, 11 Drawing Sheets

CONTAINER FOOTING SYSTEM AND METHOD OF USE

BACKGROUND

Field of the Invention

The present invention relates generally to a container footing system and method of use.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
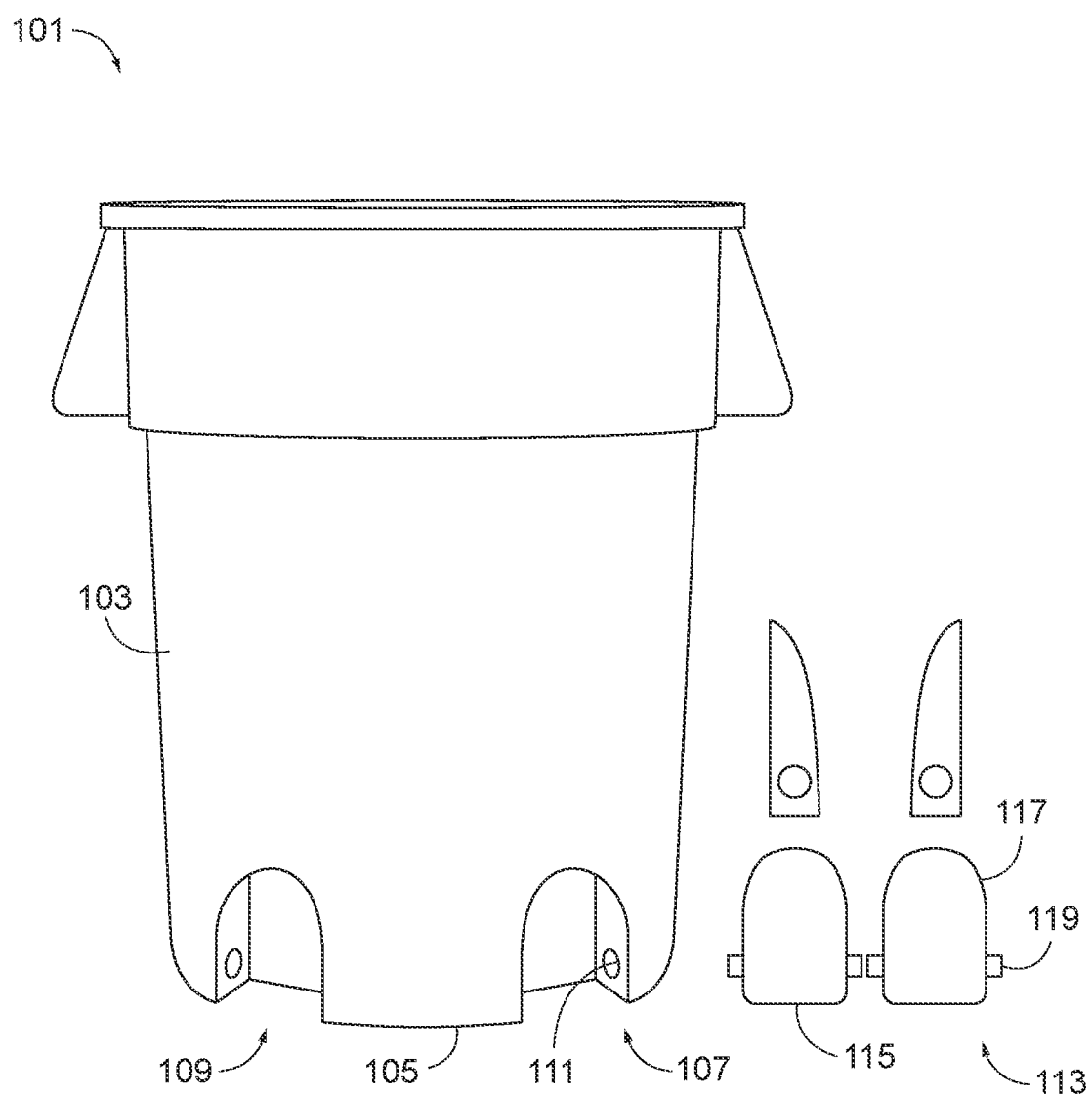
FIG. 1 is a front disassembled view of the system of the present invention.
Figure 2:
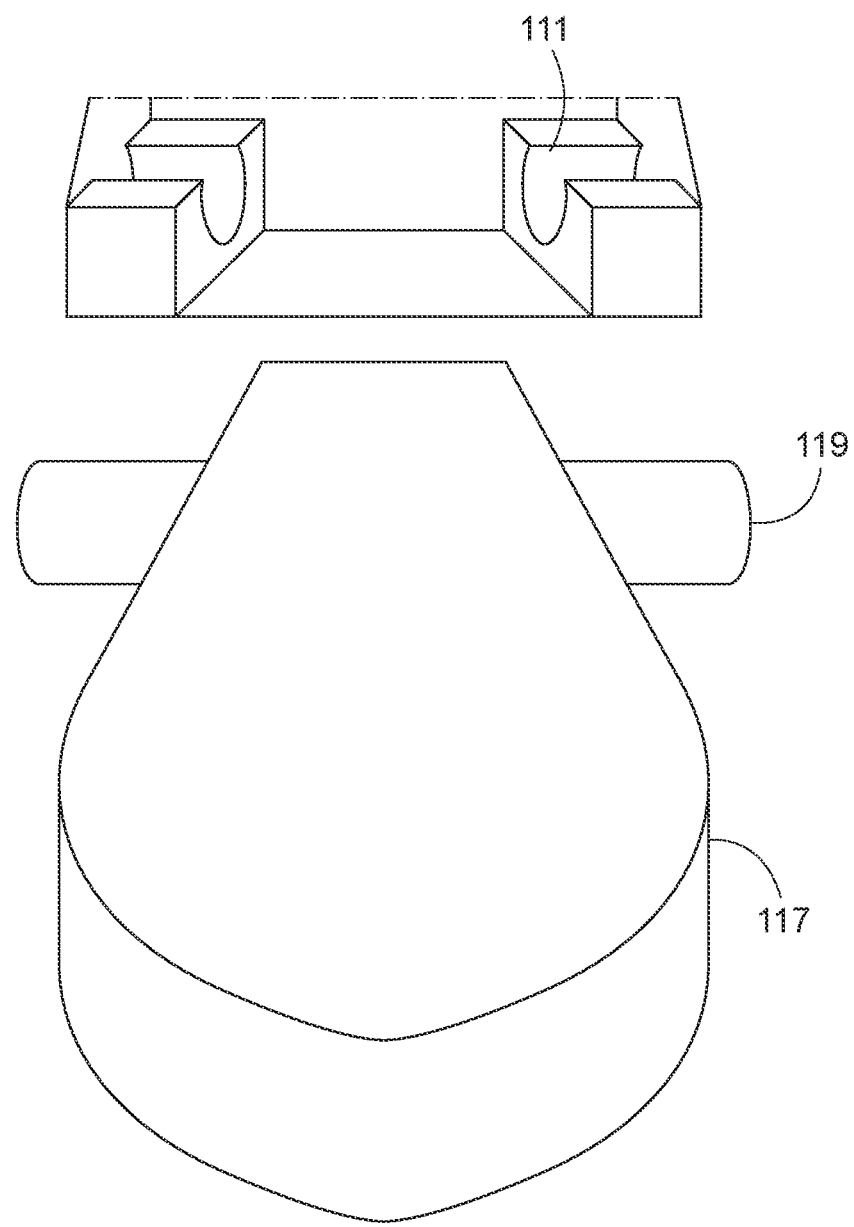
FIG. 2 is a front view of the footing of the system of FIG. 2.
Figure 3:
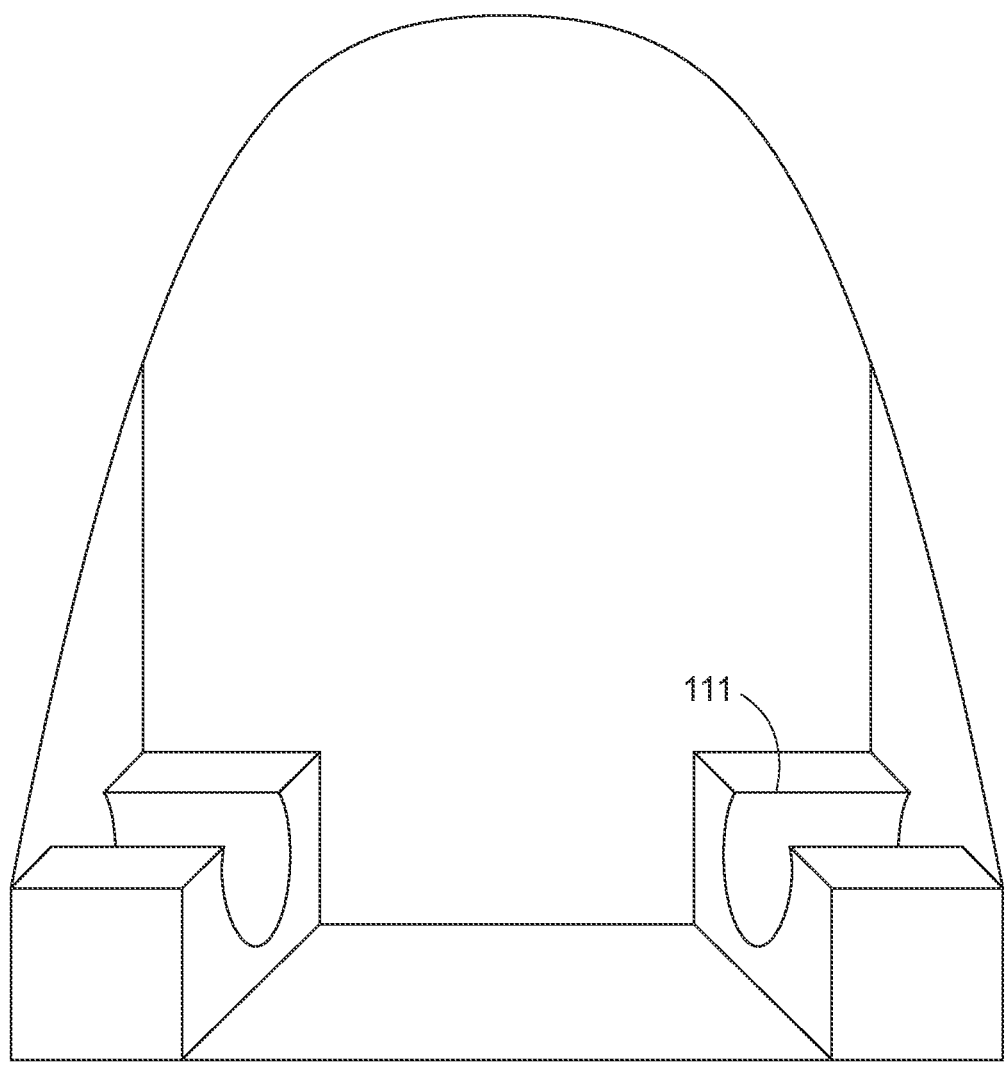
FIG. 3 is a front view of a footer adapter of the system of FIG. 2.
Figure 4:
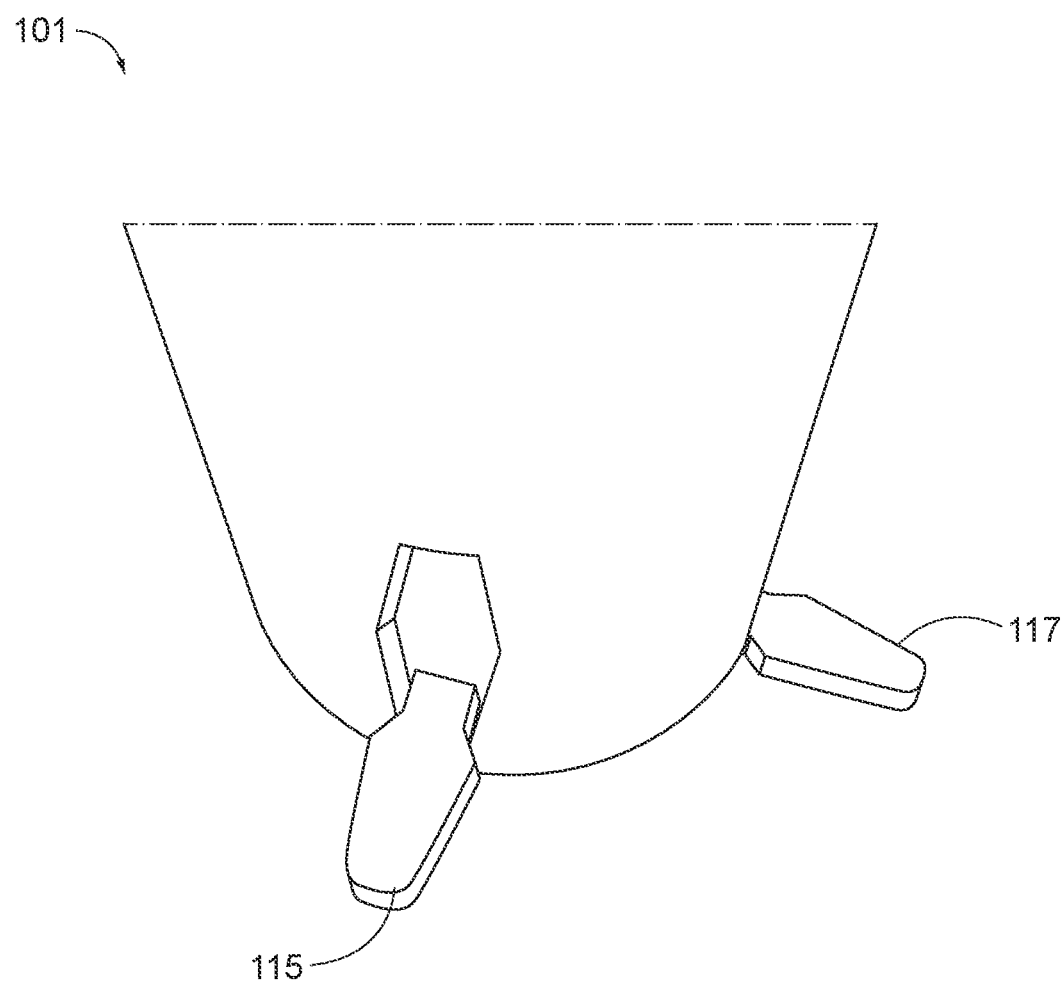
FIG. 4 is an assembled oblique view of the system of FIG. 2.
Figure 5:
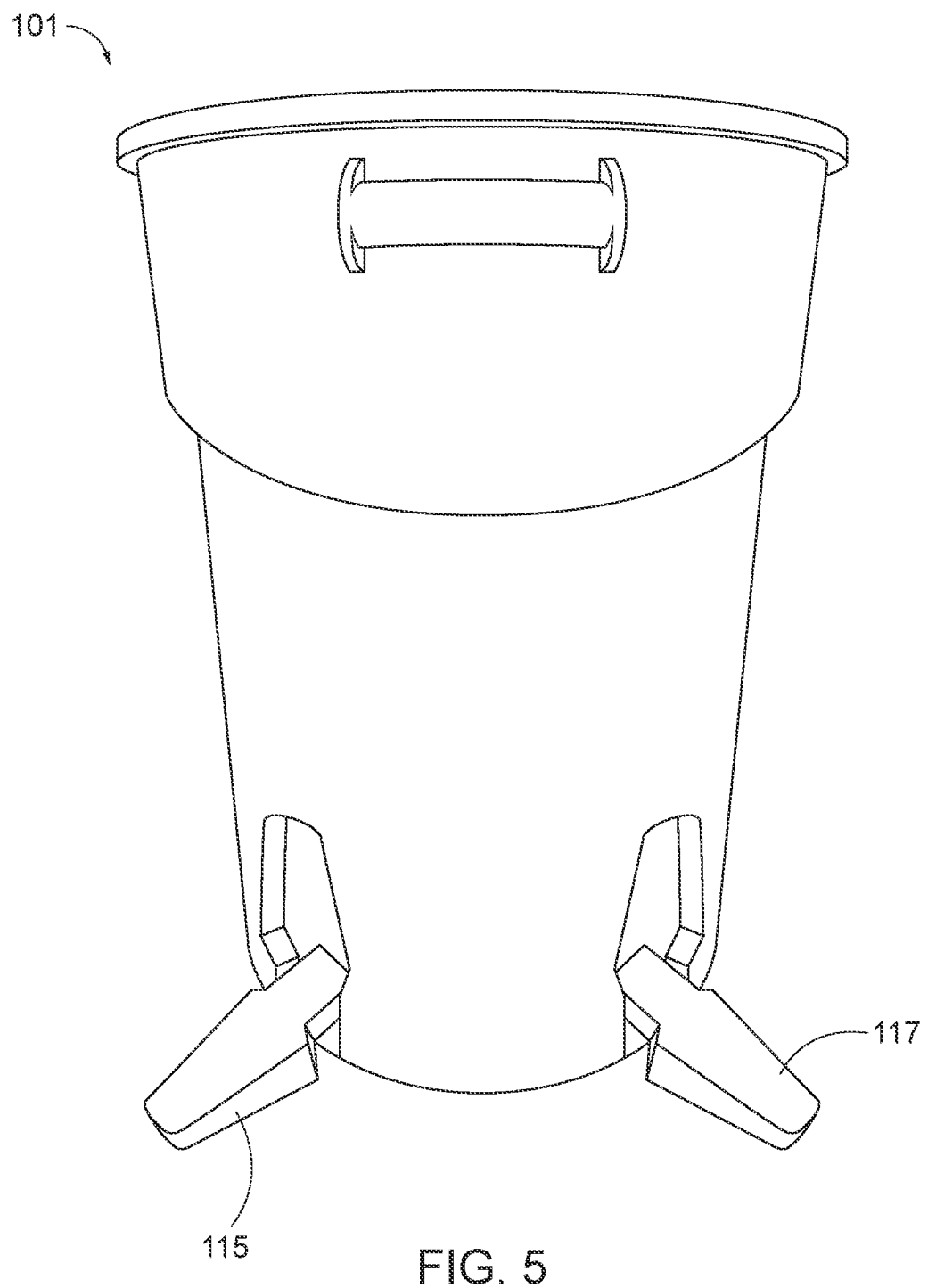
FIG. 5 is an assembled oblique view of the system of FIG. 2.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-11 depict various embodiments of system and method of use in accordance with the preferred embodiment of the present invention. It should be understood that the embodiments discussed herein are substantially similar in form and function and share one or more of the features discussed in each embodiment although the features may not be shown specifically with reference to the particular embodiment.

As shown in the drawings, the present invention is related to a footing system configured to engage with a side of a container, which in the preferred embodiment, is a garbage can. In one of the preferred embodiment, the footing is configured to pivotally attach to the side of the container, which in turn allows the user to step thereon for secure the container to the ground surface. In some contemplated embodiments, the footing is configured to removably engage with the side of the container at various heights; accordingly, the footing is contemplated being pivotally attached at a designated location while also being configured to being secured at various heights relative to the ground surface.

Figure 9:
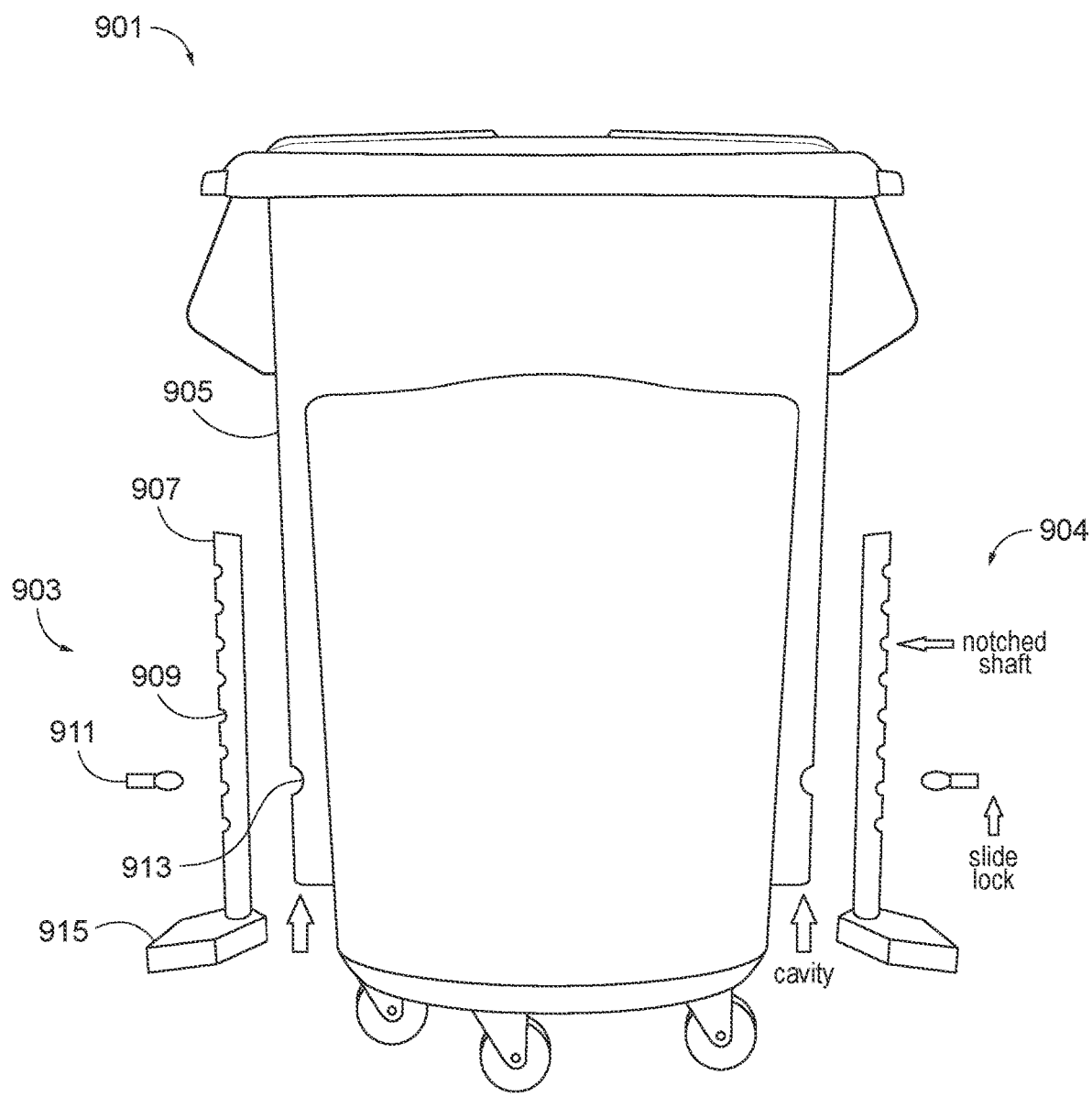
FIG. 9 is a front disassembled view of the system of the present invention in accordance with an alternative embodiment of the present invention.
Figure 10:
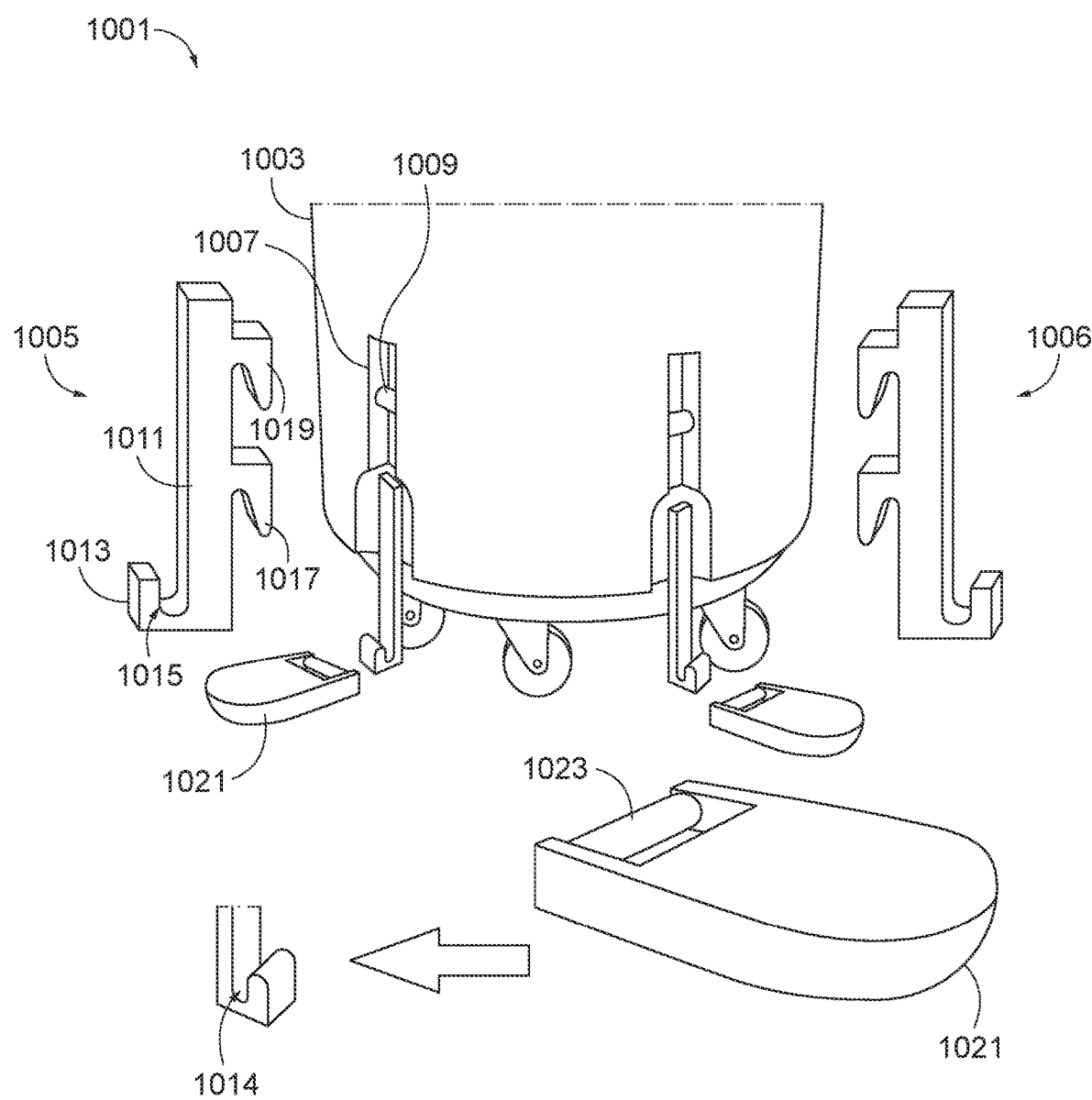
FIG. 10 is a front disassembled view of the system of the present invention in accordance with an alternative embodiment of the present invention.

The means to secure the adjustable height footings include channel zip tie and ratchet configuration along with a fastening configuration shown in FIG. 10 and a notched shaft configuration, as shown in FIG. 9. In these embodiments, the footings could be configured to pivotally engage with the fastening devices or rigidly secure thereto.

Figure 6:
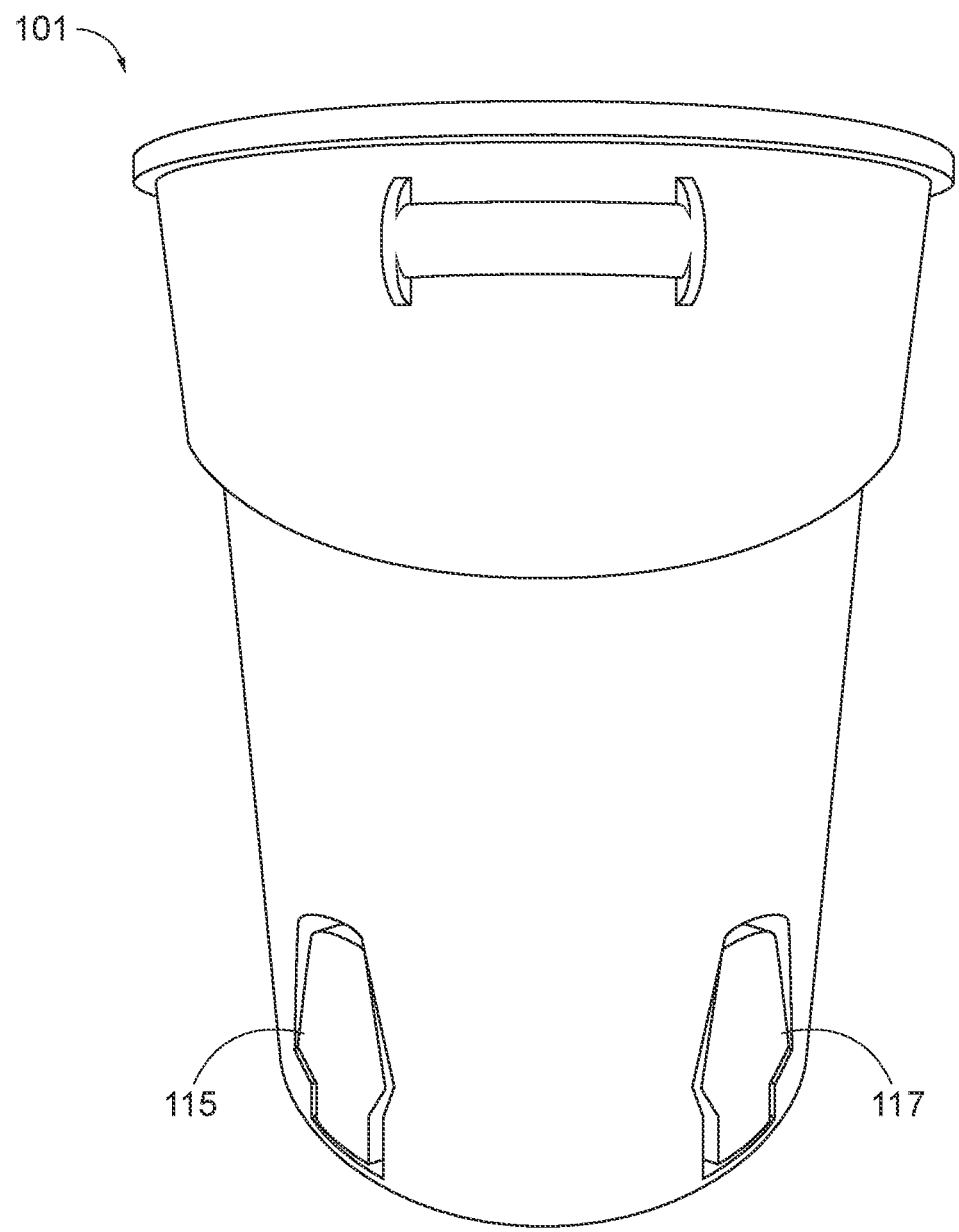
FIG. 6 is an assembled oblique view of the system of FIG. 2.
Figure 7:
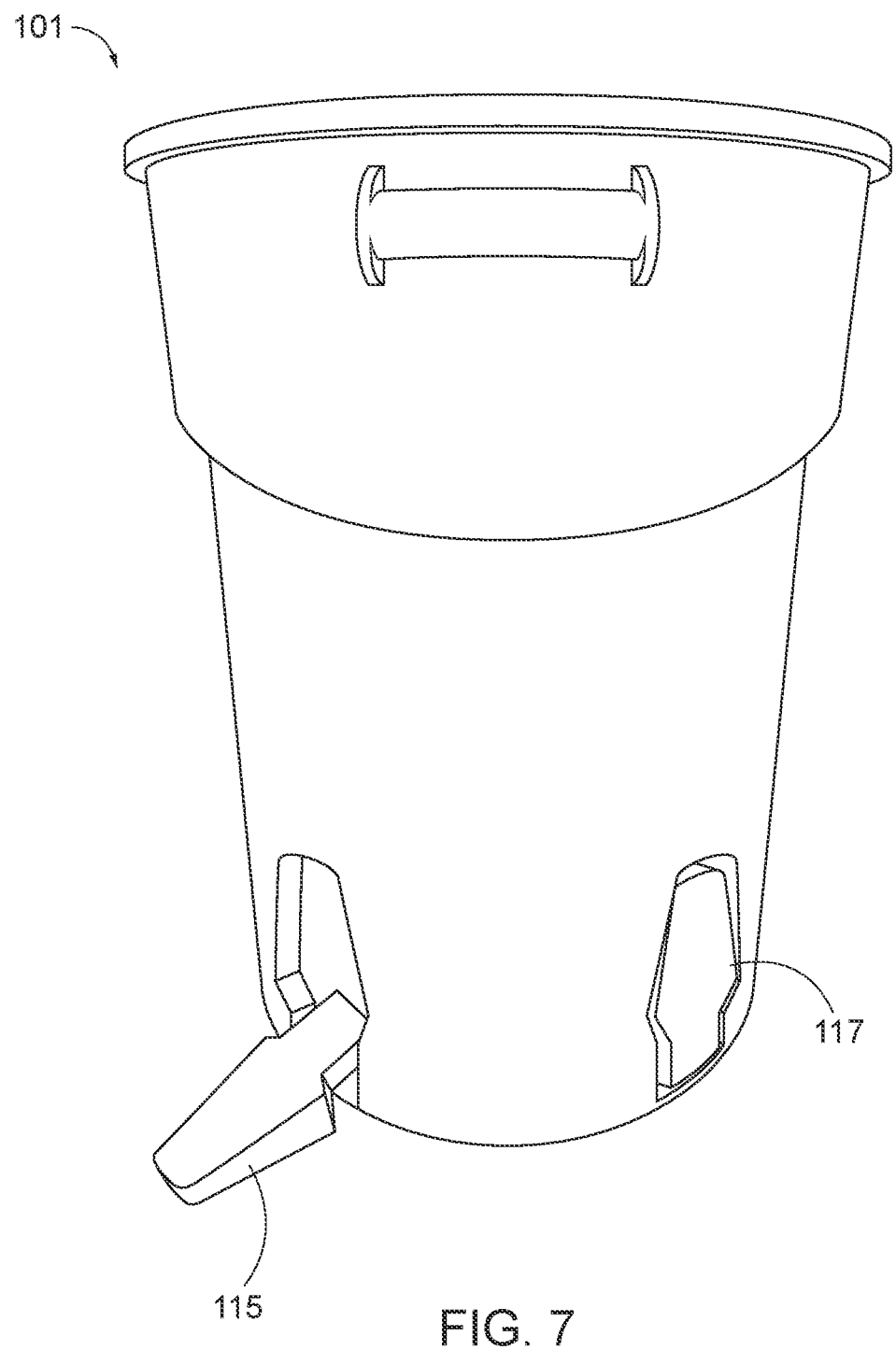
FIG. 7 is an assembled oblique view of the system of FIG. 2.
Figure 8:
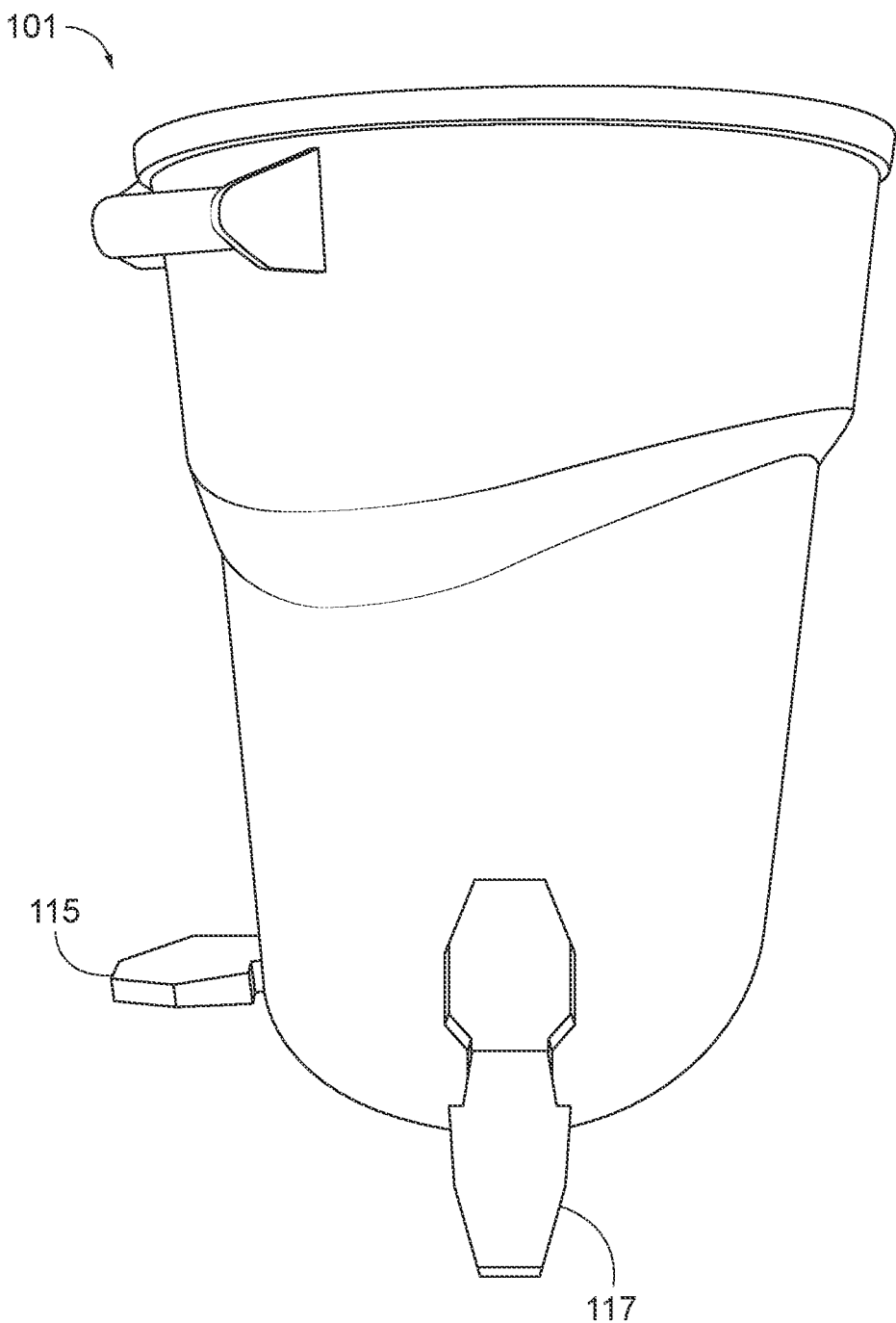
FIG. 8 is an assembled oblique view of the system of FIG. 2.

With respect to the preferred embodiment without means to adjust the height, it is contemplated having a plurality of housing disposed inwardly from an outer surface of the container and configured to secure the footing therein, see FIG. 6. The footings are then able to pivot outwardly from the housings, see FIG. 5.

Referring now to FIG. 1, a system 101 include a container 103 with a body having a lower surface 105 with two or more openings 107, 109 configured to hold one or more respective footing apparatuses 113 therein. In the preferred embodiment, the apparatus 113 includes a footing 115 and footing 117 configured to pivotally fit within respective openings 109, 107 and pivot therein via one or more tabs 119 that extend from the body of the footings and configured to engage with holes 111 disposed within the openings. Such features are shown in FIGS. 1-8 in the various views of the system 101.

In FIG. 9, an alternative embodiment of system 101 is shown. In the preferred embodiment, the system 901 utilizes two footing apparatuses 904, 904 positioned on opposing sides of the container and adapted to engage with one or more protruding elongated members 905 extending from the body of the container. In one embodiment, the apparatus 903 includes an elongated slide 907 configured to slidingly engage with member 905. The slide 907 includes a plurality of notches 909 configured to engage with a locking device 911 and slot 913. The slide also includes a footing 915 positioned at one end of the elongated body and configured to engage with the surface that the container is held thereon.

In FIG. 10 an alternative embodiment is shown. System 1001 includes footing apparatuses 1005, 1006 positioned on opposing sides of the container 1003. In the preferred embodiment, the container has a slot 1007 with a rod 1009 disposed therein and a shaft 1014 disposed therein. In one embodiment, the apparatus includes a elongated member 1011 having a plurality of hooks 1017, 1013, and 1019 selectively positioned at various locations and configured to engage with the rod 1009 for selective height adjustment. In one embodiment, the footing 1021 includes a shaft 1023 that is configured to engage with either sections 1014, 1015.

Figure 11:
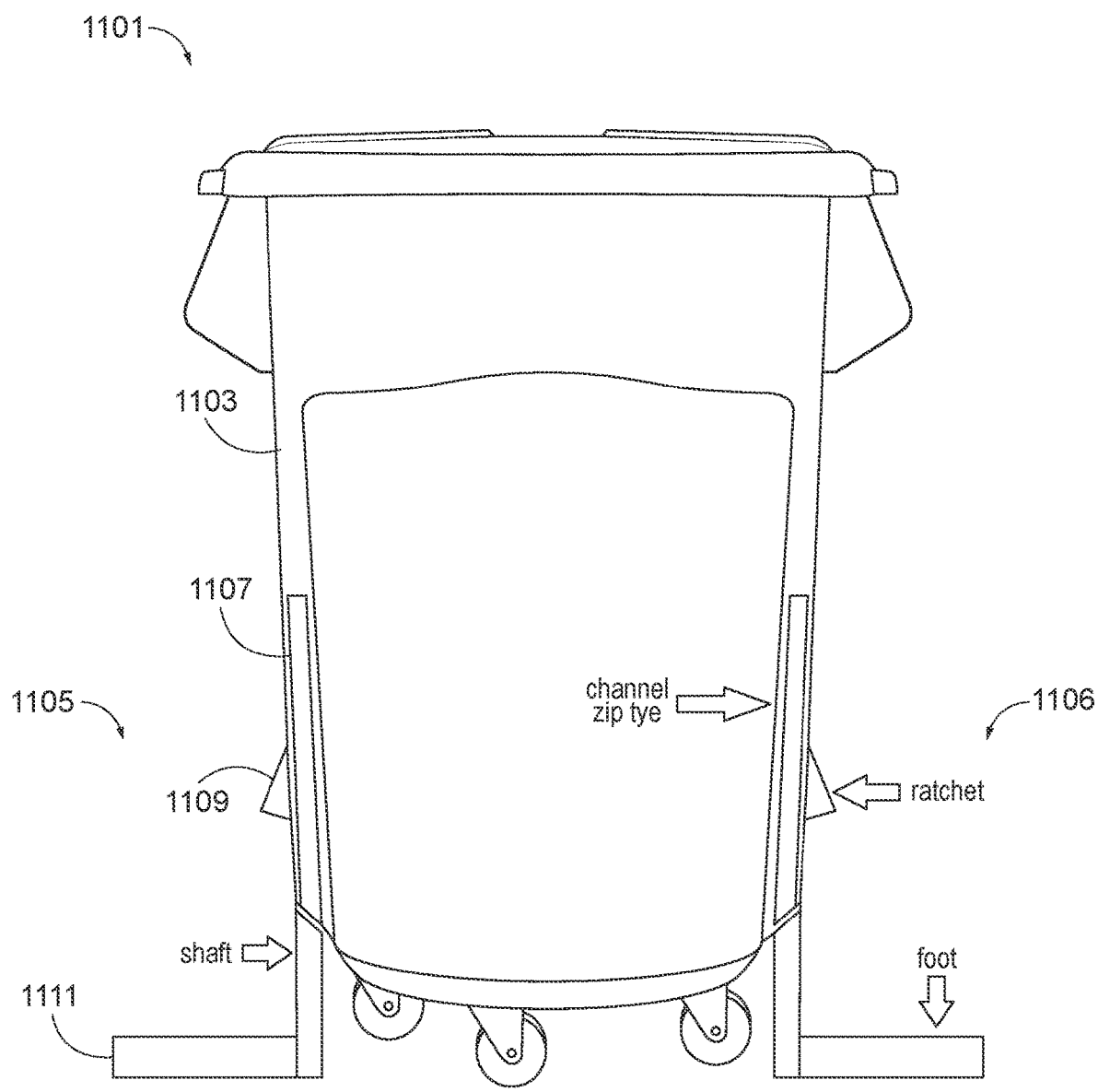
FIG. 11 is a front disassembled view of the system of the present invention in accordance with an alternative embodiment of the present invention.

In FIG. 11, an alternative embodiment 1101 is shown wherein two apparatuses 1105, 1106 are configured to selectively engage with opposing sides of the container 1103. The apparatus 1105 includes a shaft 1107 with a footing 1111 secured thereto and secured to the container 1103 via a rachet system 1109.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A container system, comprising:
 a container having:
  a body with a lower surface; and
  a first opening extending into the body from the lower surface;
 a first rod positioned within the first opening;
 a first elongated member configured to engage with the first rod at a plurality of locations;
 a first footing having
  a shaft configured to engage with one or more hooks extending from the first elongated member;
 wherein the plurality of locations allows for the first footing to raise and lower the body of the container.

\* \* \* \* \*